US010247477B2

(12) United States Patent
Smith et al.

(10) Patent No.: US 10,247,477 B2
(45) **Date of Patent: *Apr. 2, 2019**

(54) PANEL FOR FERROUS OR NON-FERROUS METAL MAKING FURNACE

(76) Inventors: Todd G. Smith, Harmony, PA (US); Allan Macrae, Harmony, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/148,003

(22) PCT Filed: Mar. 30, 2011

(86) PCT No.: PCT/US2011/030611

§ 371 (c)(1), (2), (4) Date: Dec. 23, 2011

(87) PCT Pub. No.: WO2011/123579

PCT Pub. Date: Oct. 6, 2011

(65) Prior Publication Data

US 2013/0008636 A1 Jan. 10, 2013

Related U.S. Application Data

(60) Provisional application No. 61/319,089, filed on Mar. 30, 2010.

(30) Foreign Application Priority Data

Jul. 8, 2010 (WO) ................ PCT/US2010/004141

(51) Int. Cl.

*F28F 3/12* (2006.01)
*B23P 19/04* (2006.01)
(Continued)

(52) U.S. Cl.

CPC ................ *F27B 3/24* (2013.01); *C21B 7/106* (2013.01); *F27D 1/12* (2013.01); *F27D 9/00* (2013.01);
(Continued)

(58) Field of Classification Search

CPC ...... F27D 1/12; F27D 9/00; F27D 2009/0029; F27D 2009/0032; F27D 2009/0054;
(Continued)

(56) References Cited

U.S. PATENT DOCUMENTS 3,953,008 A * 4/1976 Bashinsky et al. ........... 266/193
4,157,816 A * 6/1979 Legille .......................... 266/194
(Continued)

OTHER PUBLICATIONS

Form PCT/ISA/220, PCT Notification of Transmittal of the International Search Report and the Written Opinion of the International Search Authority, or the Declaration, PCT/US11/30611, dated Jul. 18, 2011.
(Continued)

*Primary Examiner* — Jessee R Roe
*Assistant Examiner* — Michael Aboagye

(57) ABSTRACT

A plate cooler stave for use in a furnace having a shell wall, comprising: a top portion housing at least one cooling fluid inlet and at least one cooling fluid outlet for the flow of cooling fluid to and from the plate cooler stave from outside the furnace; and a main body disposed at an angle relative to the top portion so that the main body may be inserted into the furnace through an opening defined by the shell wall, wherein upon installation, at least a part of the top portion is disposed in the opening.

29 Claims, 5 Drawing Sheets

(51) Int. Cl.

| | |
|---|---|
| ***F27B 3/24*** | (2006.01) |
| ***C21B 7/10*** | (2006.01) |
| ***F27D 1/12*** | (2006.01) |
| ***F27D 9/00*** | (2006.01) |

(52) U.S. Cl.

CPC ................ *F27D 2009/0021* (2013.01); *F27D 2009/0029* (2013.01); *F27D 2009/0032* (2013.01); *F27D 2009/0054* (2013.01); *Y10T 29/49826* (2015.01)

(58) Field of Classification Search

CPC ...... F27D 2009/0021; F27B 3/24; C21B 7/10; C21B 7/106; Y10T 29/49826

USPC ..... 266/46, 190, 193, 194, 241, 99, 280, 78, 266/286; 29/428; 165/169, 170; 432/83

See application file for complete search history.

(56) References Cited

U.S. PATENT DOCUMENTS

| | | | | |
|---|---|---|---|---|
| 5,678,806 | A * | 10/1997 | Hille et al. | 266/193 |
| 5,904,893 | A * | 5/1999 | Stein | 266/46 |
| 9,102,990 | B2 * | 8/2015 | Smith | F23M 5/02 |
| 9,121,076 | B2 * | 9/2015 | Smith | C21B 7/06 |
| 2008/0111287 | A1 * | 5/2008 | Pyne | 266/190 |

OTHER PUBLICATIONS

Form PCT/ISA/210, PCT International Search Report for International Application No. PCT/US2011/0030611, dated Jul. 18, 2011.

Form PCT/ISA/237, PCT Written Opinion of the International Searching Authority for International Application No. PCT/US2011/030611, dated Jul. 18, 2011.

* cited by examiner

PANEL FOR FERROUS OR NON-FERROUS METAL MAKING FURNACE

CROSS-REFERENCE TO RELATED APPLICATIONS

The present application claims benefit and priority from U.S. provisional application Ser. No. 61/319,089 entitled "Panel For Ferrous Or Non-Ferrous Metal Making Furnace," filed on Mar. 30, 2010, the disclosure of which is hereby incorporated by reference in its entirety for all purposes; this application is also a continuation-in-part of international patent application Ser. No. PCT/US2010/041414, filed Jul. 8, 2010, entitled "Apparatus And Method For Frame And Brick Constructions," which claims priority to (1) U.S. provisional patent application Ser. No. 61/223,745 entitled "Furnace Stave Brick" filed Jul. 8, 2009, and (2) U.S. provisional patent application U.S. Ser. No. 61/231,477 entitled "Furnace Stave Brick" filed Aug. 5, 2009, the disclosures of which are hereby incorporated by reference in their entireties for all purposes.

FIELD OF THE INVENTION

This invention relates to apparatus and methods for cooling the furnace shell of blast furnaces and other metallurgical furnaces. Related fields include cooling staves.

BACKGROUND OF THE INVENTION

Over the past half century two principal types of cooling systems have been employed in the bosh, belly and stack of blast furnaces. These two cooling systems have been cooling plates and cooling staves, each with their own advantages and disadvantages.

Conventional cooling plates are tongue shaped coolers which protrude through a single hole in the steel furnace shell and stick into the vessel on average approximately 24 inches and are approximately 24 inches wide. Such plates are securely fastened to the steel shell and the plates are connected to an external cooling source. These cooling plates are often positioned in staggered rows around the furnace so that the distance from the center of one plate cooler to the center of the next plate cooler would be 15 to 48 inches horizontally and 15 to 36 inches vertically. The spaces between these plate coolers on the inside of the furnace are typically filled with a brick material to form a solid refractory system against the cooling plates and inside furnace wall. Cooling systems using these plates have the disadvantage that close bricks are more effectively cooled, while those located at some distance are subject to greater corrosion. Due to the non-uniform cooling, these plates do not offer as much shell protection as a cooling stave design.

Staves are elements placed between the inner side of the steel shell of a furnace and the refractory lining. The staves are typically formed with a series of tubes to carry a heat transfer fluid, such as water. The staves can cool a furnace uniformly as they may be installed to have almost complete steel shell coverage. Typical stave coolers are approximately 30" to 50" wide by 48" to 144" tall. These staves are typically bolted to the furnace wall and may have small gaps between them to allow for installation.

A major disadvantage of such a stave/brick construction is that due to the closeness to each other when installed in a furnace, such staves must be removed from the furnace to allow the bricks to be slid out of the stave channels whenever the stave/brick construction needs to be rebuilt or repaired, either in-whole or in-part. Removing such staves from the furnace is necessitated because bricks cannot be removed or inserted into stave channels through the front face of stave. Additionally, pins to support the stave, separate thermocouple shell protrusions, water pipe protrusions, and flexible compensators are typically required.

In order to overcome the disadvantages associated with typical furnace cooling plates and cooling staves, it would be desirable to provide a cooling plate or stave that combines the advantages of conventional cooling plates and cooling staves while eliminating most or all of the disadvantages of conventional cooling plates and conventional cooling staves.

It would also be desirable to provide a cooling plate that may be inserted and installed from the outside of the furnace through a single opening in the steel shell of the furnace, and supported by a secure fastening on the outside of the furnace shell while on the inside of the furnace shell, the cooling plate is disposed as a stave between the inner side of the shell and the refractory lining. It would also be desirable to provide a cooling plate where the lower end of one plate is supported by the top of a lower plate and/or one or more sides of the one plate are supported additionally by one or more sides of one or more adjacent plates. It would be desirable further to provide a cooling plate wherein an associated thermocouple may be installed within the plate cooler stave. Further, it would be desirable to provide a cooling plate that can be installed from outside the furnace yet provide for uniform cooling of the furnace like a stave while eliminating the numerous pins, thermocouple shell protrusions, water pipe protrusions and flexible compensators typically required for the installation and operation of conventional staves and/or cooling plates.

These and other advantages of the invention will be appreciated by reference to the detailed description of the preferred embodiment(s) that follow.

BRIEF SUMMARY OF THE INVENTION

In a first aspect, the present invention comprises a plate cooler stave for use in a furnace having a shell wall, comprising: a top portion housing at least one cooling fluid inlet and at least one cooling fluid outlet for the flow of cooling fluid to and from the plate cooler stave from outside the furnace; and a main body disposed at an angle relative to the top portion so that the main body may be inserted into the furnace through an opening defined by the shell wall, wherein upon installation, at least a part of the top portion is disposed in the opening.

In accordance with yet another aspect of the plate cooler stave, the main body is disposed along the shell wall.

In yet a further aspect of the plate cooler stave, the main body is disposed substantially parallel to the shell wall.

In yet another aspect of the plate cooler stave, the main body is disposed between the shell wall and a refractory lining in the furnace.

In a further aspect, the plate cooler stave further comprises a refractory lining disposed at least in part in or on the main body.

In yet a further aspect of the plate cooler stave, the top portion is attached to a cover plate and the cover plate is secured to the shell wall.

In yet a further aspect of the plate cooler stave, the cover plate is secured to the outside of the shell wall.

In another aspect of the plate cooler stave, the main body has one or more curved profiles.

In a further aspect of the plate cooler stave, the main body has at least one curved profile substantially complementary with a curvature of the shell wall.

In yet a further aspect of the plate cooler stave, the main body defines grooves or channels for holding refractory bricks.

In an additional aspect of the plate cooler stave, the angle between the top portion and the main body is greater than 90 degrees.

In yet a further aspect of the plate cooler stave, the angle between the top portion and the main body is substantially 90 degrees.

In an additional aspect of the plate cooler stave, upon installation of the plate cooler stave, the main body is disposed up, down or sideways with respect to the top portion.

In yet a further aspect of the plate cooler stave, the plate cooler stave comprises a construction selected from the group consisting of cast copper with cast in pipe, cast copper with cored water passages, cast iron with cast in pipe, cast iron with water passages, drilled copper and extruded copper.

In a further aspect, the plate cooler stave further comprises a thermocouple, wherein the thermocouple extends through the top portion and into the main body.

In another aspect, the plate cooler stave further comprises one or more surfaces defined by the top portion and/or the main body for supporting one or more adjacent plate cooler staves.

In a further aspect, the plate cooler stave further comprises a spacer support.

In an additional aspect of the plate cooler stave, the spacer support contacts the shell wall upon installation of the plate cooler stave in the furnace.

In another aspect of the plate cooler stave, the main body and the shell wall are separated by a spacer support attached to the shell wall.

In a further aspect, the plate cooler stave further comprises a steel band disposed around at least a part of the top portion, and a cover plate attached to the steel band.

In another aspect of the plate cooler stave, the main body defines a plurality of ribs and a plurality of channels, wherein a front face of the main body defines a first opening into each of the channels; and wherein the plate cooler stave further comprises a plurality of bricks wherein each brick is insertable into one of the plurality of channels via its first opening to a position, upon rotation of the brick, partially disposed in the one channel such that one or more portions of the brick at least partially engage one or more surfaces of the one channel and/or of a first rib of the plurality of ribs whereby the brick is locked against removal from the one channel through its first opening via linear movement without first being rotated.

In an additional aspect of the plate cooler stave, the main body defines one or more side openings into each of the channels.

In another aspect of the plate cooler stave, the rotation of the brick comprises a bottom of the brick moving in a direction towards the main body.

In yet an additional aspect of the plate cooler stave, a first rib surface of the first rib is complementary to a groove defined by a top of the brick and wherein the first rib surface is at least partially disposed in the groove.

In another aspect of the plate cooler stave, the main body is substantially flat.

In a further aspect of the plate cooler stave, the main body is curved with respect to one or both of a horizontal axis and a vertical axis.

In yet an additional aspect of the plate cooler stave, the main body houses a plurality of pipes.

In another aspect of the plate cooler stave, the plurality of bricks at least partially disposed in the plurality of channels form a plurality of stacked, substantially horizontal rows of bricks protruding from the front face of the main body.

In yet a further aspect of the plate cooler stave, one of the bricks cannot be pulled and/or rotated out of the first opening of its respective channel when another brick is disposed in the row above and partially or completely covers the one brick.

In another aspect of the plate cooler stave, the plurality of bricks comprise exposed faces that define a flat or uneven surface.

In a further aspect, the present invention comprises a method for cooling a furnace having a shell wall, comprising: providing a plate cooler stave having a top portion housing at least one cooling fluid inlet and at least one cooling fluid outlet for the flow of cooling fluid to and from the plate cooler stave from outside the furnace; and a main body disposed at an angle relative to the top portion; inserting the main body into the furnace through an opening defined by the shell wall; installing at least a part of the top portion in the opening; and covering the opening in the shell wall.

In another aspect, the method for cooling a furnace further comprises: covering the opening in the shell wall with a plate disposed on the top portion of the plate cooler stave.

In a further aspect, the method for cooling a furnace further comprises: locating the main body along the shell wall.

In an additional aspect, the method for cooling a furnace further comprises: locating the main body substantially parallel to the shell wall.

In another aspect, the method for cooling a furnace further comprises: installing a refractory material in or on the main body.

In an additional aspect of the method for cooling a furnace, the refractory material comprises refractory bricks disposed, at least in part, in grooves or channels defined by the main body.

In a further aspect, the method for cooling a furnace further comprises: orienting the plate cooler stave within the furnace so that one or more surfaces defined by the top portion and/or the main body provide support for one or more adjacent plate cooler staves.

In yet another aspect, the method for cooling a furnace further comprises: installing a plurality of the plate cooler staves in the furnace; wherein the plurality of plate cooler staves are disposed side-by-side with gaps between adjacent main bodies of adjacent plate cooler staves; wherein the main body of each of the plurality of plate cooler staves defines a plurality of ribs and a plurality of channels and has a front face defining a first opening into each of the channels; inserting a plurality of bricks into each of the channels via its first opening to a position, upon rotation of the brick, partially disposed in the one channel such that one or more portions of the brick at least partially engage one or more surfaces of the one channel and/or of a first rib of the plurality of ribs whereby the brick is locked against removal from the one channel through its first opening via linear movement without first being rotated; wherein each main body comprises a plurality of substantially horizontal rows of bricks disposed in the plurality of channels; and wherein the plurality of substantially horizontal rows of bricks disposed in the plurality of channels covers, in-whole or in-part, the gaps between adjacent main bodies of adjacent plate cooler staves.

BRIEF DESCRIPTION OF THE SEVERAL VIEWS OF THE DRAWING

For the present disclosure to be easily understood and readily practiced, the present disclosure will now be described for purposes of illustration and not limitation in connection with the following figures, wherein.

DETAILED DESCRIPTION OF THE INVENTION

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

Figure 1:
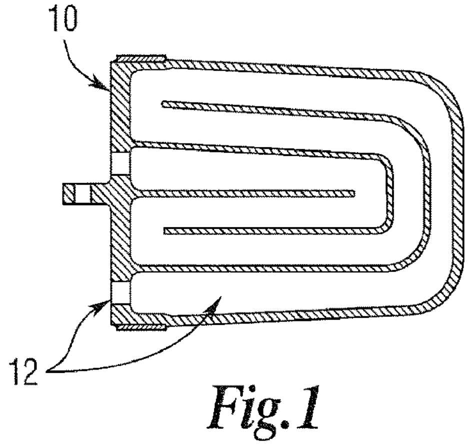
FIG. 1 is a top cross-sectional view of a conventional cooling plate.
Figure 2:
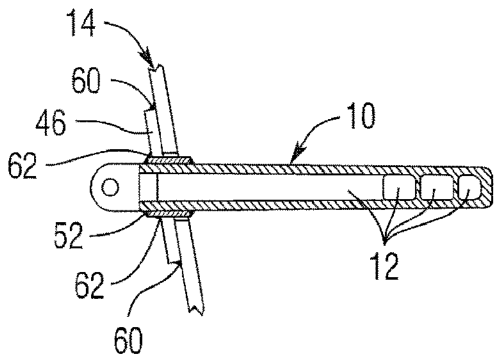
FIG. 2 is a side cross-sectional view of a conventional cooling plate with cover plate attached to a blast furnace shell.

FIG. 1 illustrates a plate cooler 10 of known construction of generally rectangular cross-section having a continuous plate channel 12 for carrying cooling fluid. Cooling plates of known design are fixedly secured to the furnace shell wall 14 as shown in FIG. 2 using a steel band 52 and a cover plate 46 welded at 60 to the furnace shell 14 and at 62 to the steel band 52.

Figure 3:
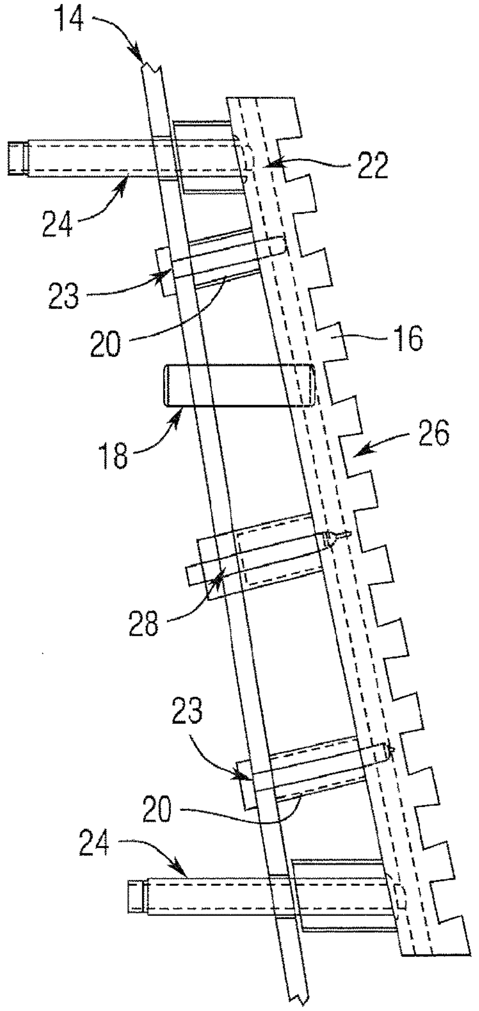
FIG. 3 is a cross-sectional view of a conventional drilled and plugged copper stave in a blast furnace application.

A typical drilled and plugged copper stave cooler 16 is shown in FIG. 3. The stave 16 is supported on the furnace shell 14 by a support pin shell protrusion 18 and bolt hole shell protrusions 20 and bolts 23. The stave 16 is cooled by a continuous stave pipe 22 or a plurality of stave pipes disposed inside the stave 16 for carrying cooling fluid. The stave pipes 22 may be connected to one or more external pipes 24 that extend from the side of the stave 16 closest to the shell 14 and penetrate the shell 14 so that coolant, such as, for example, water at an elevated pressure is pumped through the pipes 22 in order to cool the stave 16 and any refractory bricks disposed within or mechanically attached to or within stave channels 26 when assembled and installed in a furnace. The furnace shell 14 is also penetrated by a thermocouple shell protrusion 28.

Figure 4:
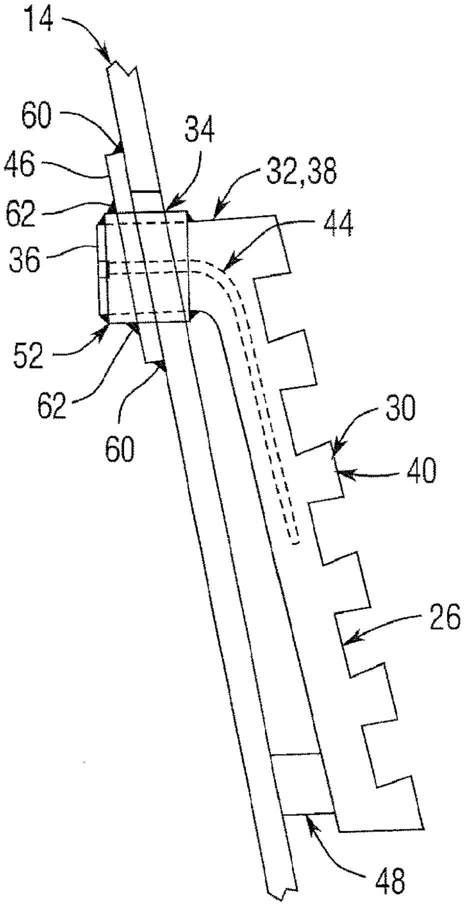
FIG. 4 is a cross-sectional view of a plate cooler stave according to a preferred embodiment of the present invention in a blast furnace application.
Figure 5:
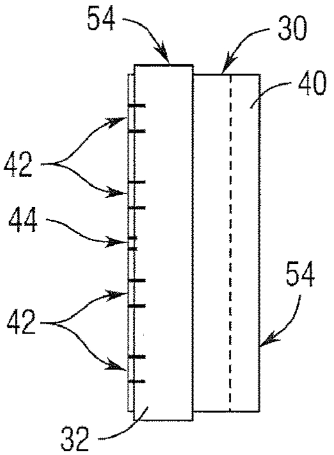
FIG. 5 is a top perspective view of a plate cooler stave according to a preferred embodiment of the present invention.
Figure 6:
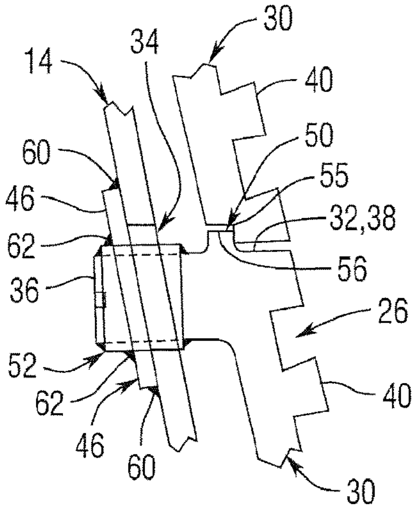
FIG. 6 is a cross-sectional view of a plate cooler stave according to a preferred embodiment of the present invention in a blast furnace application.
Figure 7:
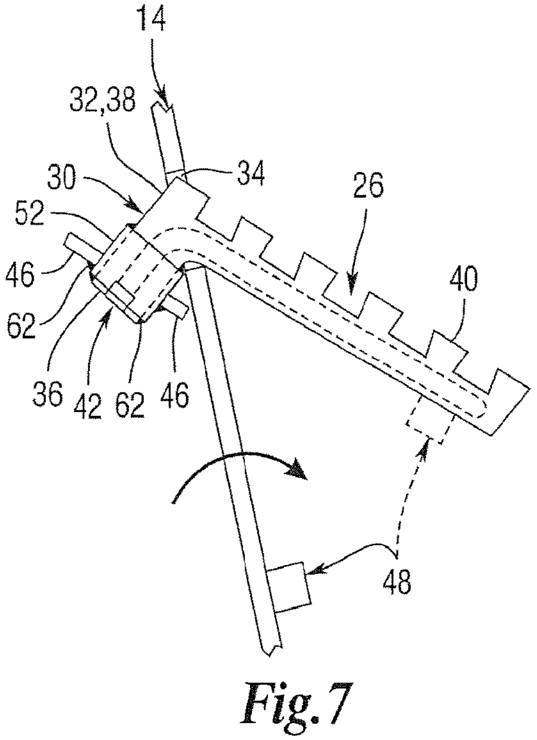
FIG. 7 is a cross-sectional view of a plate cooler stave according to a preferred embodiment of the present invention showing installation of the plate cooler stave in a blast furnace application.

A preferred embodiment of a plate cooler stave 30 according to the present invention is shown in FIGS. 4-7. The plate cooler stave 30 has a top portion 32 extending through a plate hole 34 in the wall of the furnace shell 14 providing an exposed portion 36 outside the furnace shell 14 and an internal portion 38 inside the furnace shell 14. The top portion 32 of plate cooler stave 30 is secured to the furnace shell 14. The main body 40 of the plate cooler stave 30 is upon installation disposed vertically (either up or down with respect to the top portion 32) as shown in FIG. 4 between the shell 14 of the blast-furnace and the refractory lining (not shown). FIG. 5 provides a top view of the plate cooler stave 30 and shows the top portion 32 to be broad or broader than a conventional plate cooler 10. The side views of FIGS. 4 and 7 show that the main body 40 of plate cooler stave 30 forms a panel having a large surface area similar to a conventional stave cooler 16 as shown in FIG. 3.

Preferably, cooling fluid circulating tubes or passages 42 extend throughout the plate cooler stave 30. The circulating tubes 42 issue from the plate cooler stave 30 through the exposed portion 36. A thermocouple (not shown) may enter the plate cooler stave 30 through the exposed portion 36 into an embedded thermocouple pipe 44. Preferably, a cover plate 46 is attached, as by welds 62, to a steel band 52 that has been installed around part of the top portion 32 including the exposed portion 36. The cover plate 46 is preferably attached to furnace shell wall 14 by welds 60. The cover plates 46 can be attached to the steel bands 52 on plate cooler staves 30 before or after installation of plate cooler stave 30 inside furnace shell 14.

The plate cooler staves 30 can be retrofit to existing plate holes 34 on furnace relines or designed in such a manner to overlap existing plate holes 34. As necessary, the plate cooler stave 30 may be inserted through the existing plate hole 34 in the furnace from the outside furnace shell 14 as shown in FIG. 4. If a furnace reline was being performed, the plate cooler staves 30 would likely be installed from inside the furnace shell 14 and therefore the cover plate 46 would be attached to the steel band 52 on the top portion 32 after the plate cooler staves 30 have been installed in the furnace.

In a preferred embodiment, the lower end of the main body 40 may bear against furnace shell wall 14 by a spacer support 48 as shown in FIGS. 4 and 7. The spacer support 48 may be attached to the plate cooler stave 30 or to the shell wall 14. Preferably, an overlap joint 50 comprising a shoulder 56 disposed on the internal portion 38 of a lower plate cooler stave 30 mating with a channel 55 defined by the bottom of an upper, adjacent plate cooler stave 30 as shown in FIG. 6 may also be utilized to support the ends or sides of adjacent plate cooler staves 30. This overlap joint 50 may be disposed on the top and/or bottom of the plate cooler staves 30 panels only and/or on the sides of the plate cooler staves 30 as well.

As shown herein, integrating the support mechanisms into the plate cooler staves 30 of the preferred embodiments of the present invention with or without the cover plate 46 allows each plate cooler stave 30 to be secured to furnace wall 14 at one location and eliminates the need for expansion allowances for stave pipes and other components, 18-24, required for installation and/or operation of conventional staves 16 and/or conventional cooling plates 10. Therefore, flexible compensators (not shown) generally are not required for the installation and/or operation of the stave cooling plates 30 according to preferred embodiments of the present invention.

Preferably, the stave cooling plates 30 can be used in any type of metal making furnace that requires vessel wall cooling/protection from the internal furnace environment. The materials of construction for the stave cooling plates 30 may be of any type of material suitable for metallurgical furnace environments including but not limited to the following; cast copper staves with cast in pipe, cast copper staves with cored water passages, cast iron staves with cast in pipe or cooled water passages, drilled or extruded hole copper plates or billets subsequently bent or formed to develop the turn in the water passages. In preferred embodiments, thermocouple shell protrusions 28 are being eliminated by either pre-drilling/extruding holes before forming the bent shape or by casting an embedded thermocouple pipe 44 inside the stave 30.

A steel band 52 or cover plate 46 may be pre-welded to the portion 36 of plate cooler stave 30 to simplify the installation of the same in the field. The cover plate 46 may be designed with the panel or plate cooler stave 30 and steel band 52 protruding through cover plate 46 or the plate cooler stave 30 may be contained inside the cover plate 46 with only the water and thermocouple connections sealed and protruding through the cover plate 46. The plate cooler stave 30 may be attached to the shell wall 14 by welding, bolting or any other suitable method to attach the cover plate 46. Preferably, the cover plate 46 used to install the plate cooler stave 30 would prevent gas leakage from within furnace shell 14 by covering opening 34 after installation of plate cooler stave 30.

Preferably, the plate cooler stave 30 may be utilized with a bent down, bent up or alternating shapes within the same furnace. The face 54 of the main body 40 of the plate cooler stave 30 nearest the refractory could be designed flat or curved depending on the desired shape of the furnace. Preferably, the main body 40 of the plate cooler staves 30 may define grooves 26 for installing and holding refractory bricks.

Figure 8:
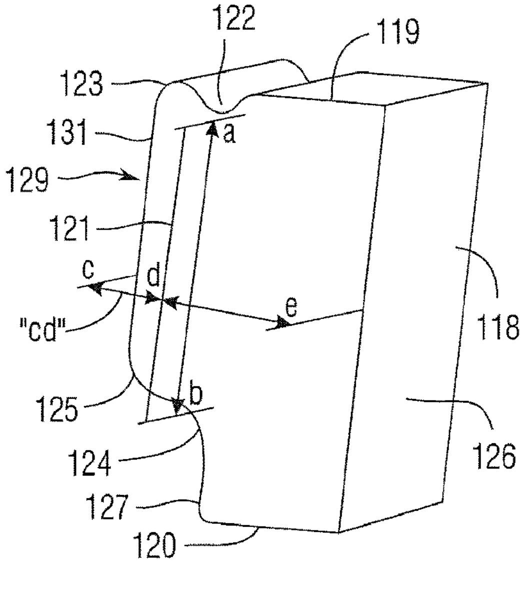
FIG. 8 is a side perspective view of a brick according to a preferred embodiment of the present invention.
Figure 9:
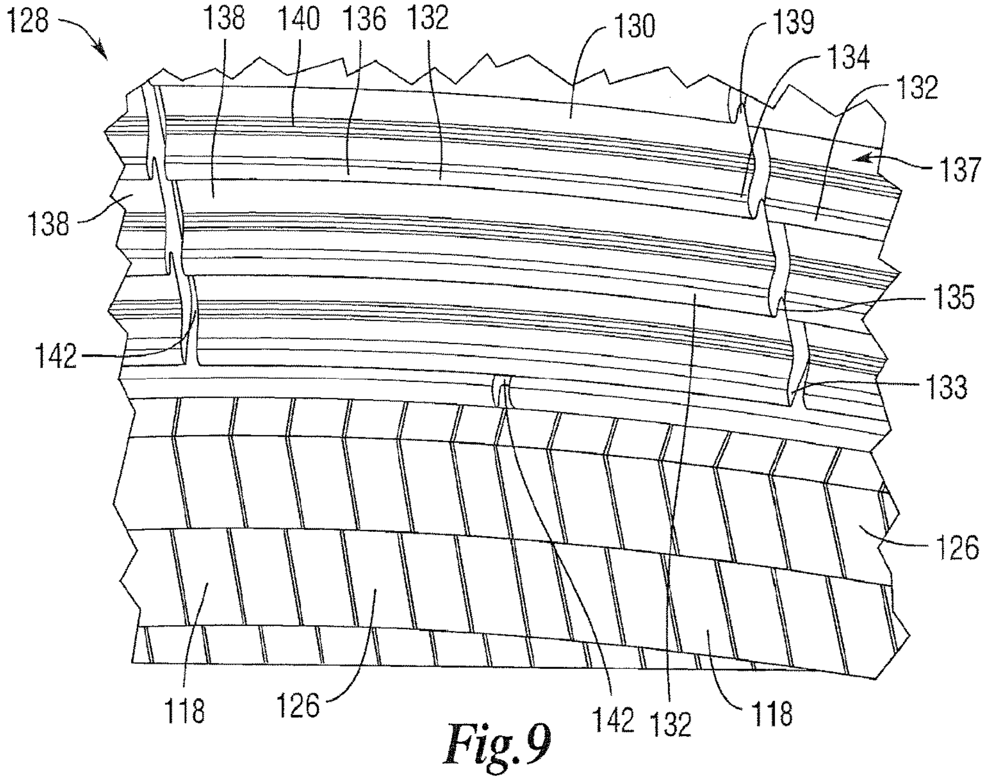
FIG. 9 is a top perspective view of a preferred embodiment of a furnace lining of the present invention comprising a preferred embodiment of a stave/brick construction of the present invention employing the brick of FIG. 8.

FIG. 8 illustrates a preferred embodiment of a refractory brick 118 according to a preferred embodiment of a stave/brick construction 128 of the present invention. Brick 118 has an exposed face 126 and oblique or slanted top and bottom sections 119 and 120, respectively. Brick 118 also comprises or defines a locking side 129 comprising concave groove 122, a generally arcuate nose 123, a generally arcuate seat 125, a generally arcuate concave section 124, a lower face 127 and a generally planar front face 131. Brick 118 also has a neck 121, the vertical thickness ("ab") of which is increased with respect to the vertical neck 115 of known bricks 114. Preferably, the length "ab" of vertical neck 121 is equal to or greater than about two (2) times the length "cd" of the depth of brick 118 that is disposed in stave channel 137 when the brick 118 is installed therein. The shapes, geometries and/or cross-sections of brick 118 and/or any part thereof, including, without limitation, one or more of exposed face 126, lower face 127, front face 131, oblique/slanted top section 119, oblique/slanted bottom section 120, groove 122, nose 123, seat 125, concave section 124 and front locking side 129 may be modified or take other forms such as being angular, rectilinear, polygonal, geared, toothed, symmetrical, asymmetrical or irregular instead the shapes of the preferred embodiments thereof as shown in the drawings hereof without departing from the scope of the invention hereof. The refractory bricks 118 of the present invention preferably may be constructed from many of the refractory materials currently available including, but not limited to, silicon carbide (such as Sicanit AL3 available from Saint-Gobain Ceramics), MgO—C (magnesia carbon), alumina, insulating fire brick (IFB), graphite refractory brick and carbon. In addition, bricks 118 may be constructed from alternating or different materials depending upon their location in a stave 130 or within the furnace. Also, as set forth above, the shape of bricks 118 may also be modified or altered to meet various stave and/or furnace spaces and/or geometries.

Preferred embodiments of a stave/refractory brick construction 128 of the present invention is shown in FIGS. 8-13 and 15, including a preferred embodiment of a main body 40 and/or stave 130 of the present invention. Stave 130 may comprise a plurality of pipes (not shown) which may be attached to one or more external pipes that extend from the furnace shell side of the stave 130 and penetrate the metal shell of the furnace so that coolant, such as, for example, water at an elevated pressure is pumped through such pipes (not shown) in order to cool the stave 130 and any refractory bricks 118 disposed within stave channels 137 thereof when assembled and installed in a furnace. Preferably, the stave 130 is constructed of copper, cast iron or other metal of high thermal conductivity, while any pipes disposed with stave 130 are preferably made from steel.

Each stave 130 preferably may be curved about its horizontal axis and/or about its vertical axis to match the internal profile of the furnace or area in which they will be used. Each stave 130 may preferably comprises a plurality of stave ribs 132 and a stave socle 133 to support stave 130 in a standing position which may be a fully upright 90 degrees as shown, or a tilted or slanted position (not shown). Each stave rib 132 preferably defines a generally arcuate top rib section 134 and a generally arcuate bottom rib section 135. Stave 130 preferably defines a plurality stave channels

137 between each successive pair of stave ribs 132. Preferably, each stave channel 137 is generally "C-shaped" or "U-shaped" and includes a generally planar stave channel wall 138, although stave channel wall 138 may also be curved or contoured along its vertical and/or horizontal axes, toothed, etc., to be complementary with the front face 131 of brick 118 if such front face 131 has a shape other than the planar shape depicted herein, which may depend upon the application. Each stave channel 137 also preferably includes a generally arcuate upper channel section 139 and a generally arcuate lower channel section 140, all as defined by stave 130 and a successive pair of stave ribs 132. The shapes, geometries and/or cross-sections of one or more of the stave ribs 132, top rib sections 134, bottom rib sections 135, stave channels 137, stave channel walls 138, upper channel sections 139 and lower channel sections 140, preferably may be modified or take other focus such as being contoured, angular, rectilinear, polygonal, geared, toothed, symmetrical, asymmetrical or irregular instead the shapes of the preferred embodiments thereof as shown in the drawings hereof without departing from the scope of the invention hereof.

Figure 10:
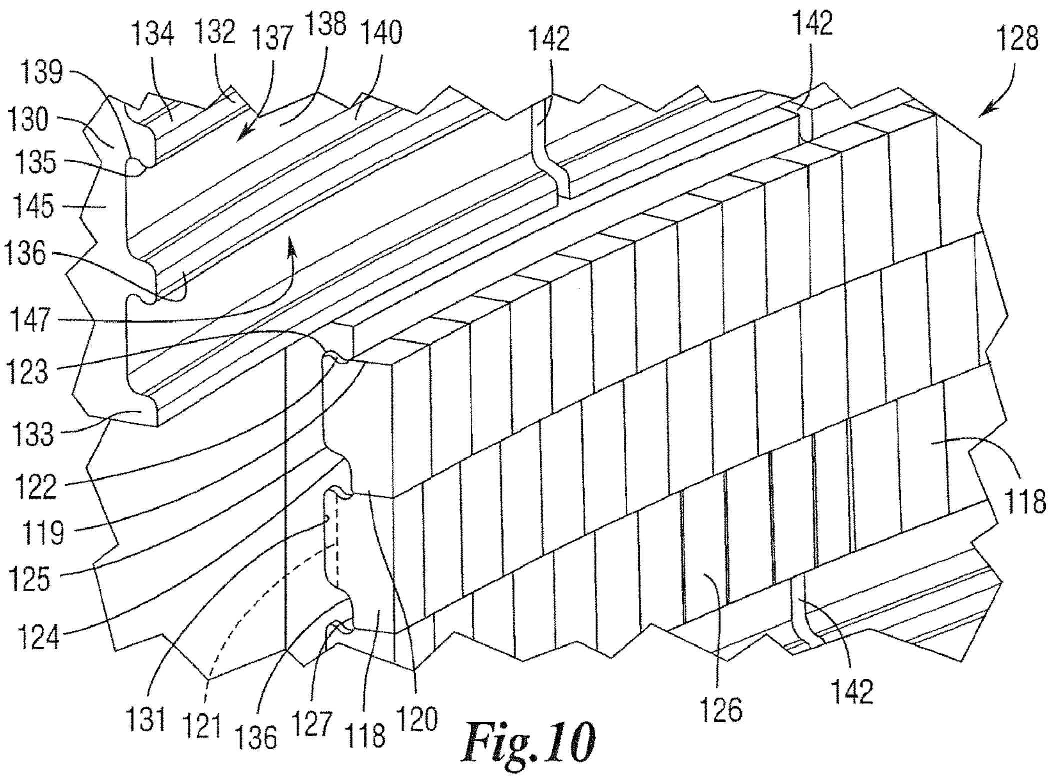
FIG. 10 is a side perspective view of a preferred embodiment of a furnace lining of the present invention comprising a preferred embodiment of a stave/brick construction of the present invention employing the brick of FIG. 8.
Figure 11:
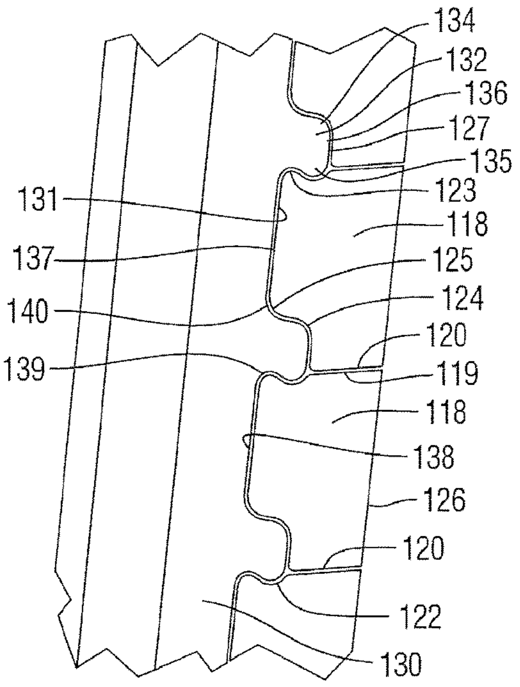
FIG. 11 is a cross-sectional view of a preferred embodiment of a stave/brick construction of the present invention employing the brick of FIG. 8.
Figure 12:
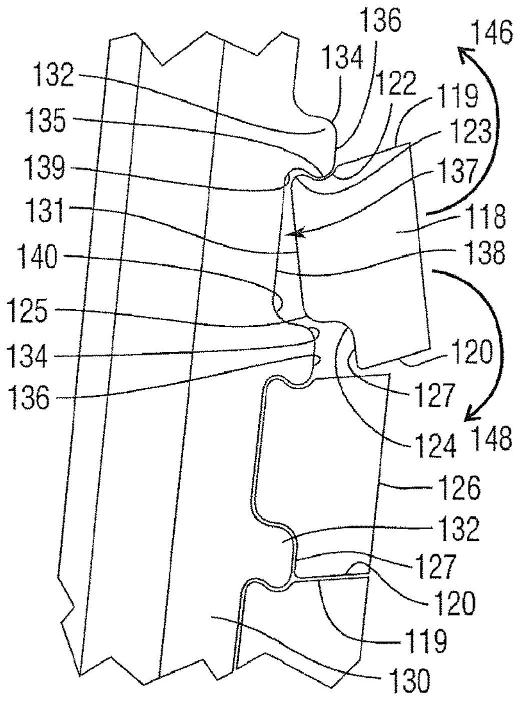
FIG. 12 is a cross-sectional view of a preferred embodiment of a stave/brick construction of the present invention showing the brick of FIG. 8 as it is being inserted or removed from a front face of a preferred embodiment of a stave of the present invention.

As shown in FIGS. 11 and 12, while the stave bricks 118 of the present invention may be slid into stave channels 137 from the sides 145 of stave 130 when space permits, stave bricks 118 may also preferably and advantageously be inserted into the front face 147 of staves 130. Beginning at the bottom of each main body 40 and/or stave 130, each stave channel 137 may be filled with stave bricks 118 by rotating or tilting each brick 18 in a first direction 146 where the bottom portion of brick 118 moves away from stave 130 preferably (1) about an axis substantially parallel a plane of the stave or (2) to allow nose 123 to be inserted into stave channel 137 and into concave, arcuate upper channel section 139, after which brick 118 is rotated in a second direction 148 generally such that the bottom of brick 118 moves toward stave 130 until (i) nose 123 is disposed in-whole or in-part within concave, arcuate upper channel section 139 with or without the perimeter of nose 123 being in partial or complete contact with upper channel section 139, (ii) front face 131 of brick 118 is disposed substantially near and/or adjacent to channel wall 138 with or without the front face 131 being in partial or complete contact with channel wall 138, (iii) arcuate seat 125 is disposed in-whole or in-part within arcuate lower channel section 140 with or without the perimeter of seat 125 being in partial or complete contact with lower channel section 140, (iv) arcuate concave section 124 is disposed in-whole or in-part over the arcuate top rib section 134 of the lower stave rib 132 of the successive pair of stave ribs 132 defining the stave channel 137 into which the brick 118 is being inserted with or without the inside surface of concave section 124 being in partial or complete contact with the arcuate top rib section 134 of such lower stave rib 132, (v) lower face 127 of brick 118 is disposed substantially near and/or adjacent to rib face 136 with or without the lower face 127 being in partial or complete contact with rib face 136, and/or (vi) slanted bottom section 120 of the brick 118 being installed is disposed substantially near and/or adjacent to slanted top section 119 of the brick 118 immediately below the brick 118 being installed with or without such slanted bottom section 120 being in partial or complete contact with such slanted top section 119, in the case where the brick 118 is being installed in any of the stave channels 137 except the lowest stave channel 137 of stave 130. As illustrated in FIGS. 10-12, when the nose 123 is disposed in-whole or in-part within concave, arcuate upper channel section 139 with or without the perimeter of nose 123 being in partial or complete contact with concave, upper channel section 139, and/or arcuate seat 125 is disposed in-whole or in-part within concave, arcuate lower channel section 140 with or without the perimeter of seat 125 being in partial or complete contact with concave, lower channel section 140, each of the bricks 118 is prevented from being moved linearly out of stave channel 137 through the opening in the front face 147 of stave 130 without each brick 118 being rotated such that the bottom thereof is rotated away from the front face 147 of stave 130.

As also shown in FIGS. 10-13, once a row of bricks 118 is installed in a stave channel 137 above a row of previously installed bricks 118, the bricks 118 in such immediately lower row are locked into place and cannot be rotated in the first direction 146 away from stave 130 to be removed from stave channel 137. The stave/refractory brick construction 128 of the present invention as shown in FIGS. 8-12 and 15 may be employed with or without mortar between adjacent stave bricks 118.

Figure 13:
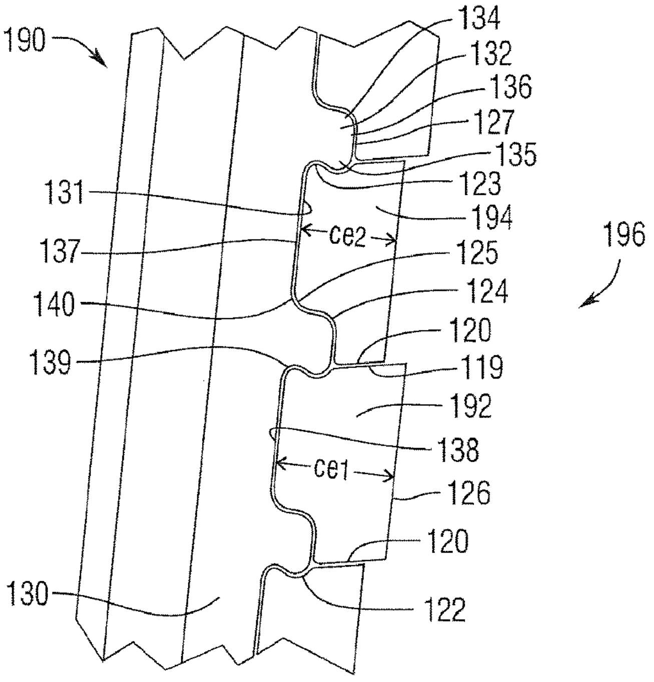
FIG. 13 is a cross-sectional view of a preferred embodiment of an alternative stave/brick construction of the present invention employing at least two different sizes of the bricks of FIG. 8.

FIG. 13 illustrates another preferred embodiment of a stave/brick construction 190 of the present invention which is the same as stave/brick construction 128 of FIGS. 9-12 except that it employs at least two different sizes of stave bricks 192 and 194, respectively, to form an uneven front face 196. As shown, bricks 192 of the stave/brick construction 190 have a greater overall depth "ce1" than the depth "ce2" of bricks 194. This staggered construction resulting from the different depths of stave bricks 192 and 194, respectively, may preferably be used in accretion zones or other desirable zones of the furnace where the uneven front face 196 would be more effective at holding an accretion or buildup of material to further protect the bricks 192 and 194 from thermal and/or mechanical damage.

Figure 14:
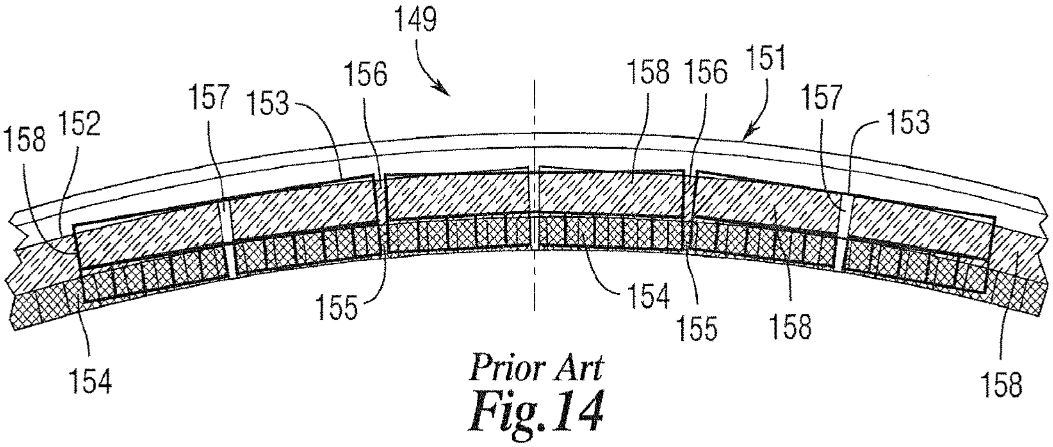
Prior Art Fig.14
FIG. 14 is a top plan view of a conventional furnace lining employing conventional stave/brick constructions.
Figure 15:
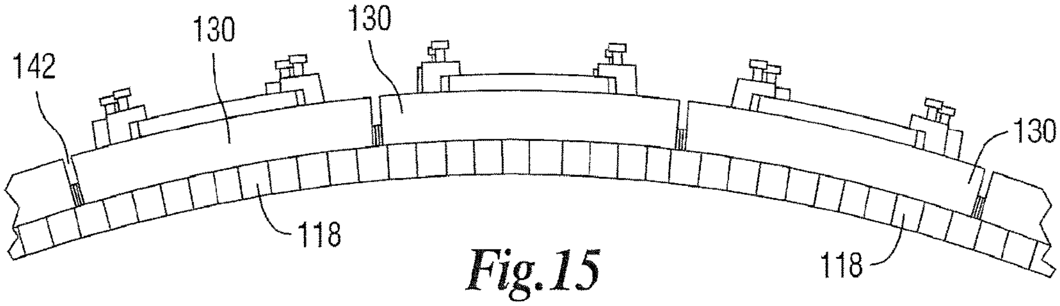
FIG. 15 is a top plan view of a preferred embodiment of a furnace lining of the present invention comprising a preferred embodiment of a stave/brick construction of the present invention employing the brick of FIG. 8.

FIG. 14 illustrates the use of conventional stave/brick constructions 158 within a furnace 149. When using flat or curved staves/coolers, such as the flat/planar upper and lower staves 152 and 153, respectively, with pre-installed bricks 154 arranged within furnace shell 151, such staves 152 and 153 are installed in the furnace 149 such that ram gaps 156 exist in between adjacent pairs of upper staves 152 and such that ram gaps 157 exist in between adjacent pairs of lower staves 153, both to allow for construction allowance. These ram gaps 156 and 157 must be used to allow for construction deviation. Such ram gaps 156 and 157 are typically rammed with refractory material (not shown) to close such gaps 156 and 157 between the adjacent stave/brick constructions 158. Such material filled gaps 156 and 157 typically are weak points in such conventional furnace linings using stave/brick constructions 158. During operation of furnace 149, the rammed gaps 156 and 157 erode prematurely and furnace gases track between the stave/brick constructions 158. With the preferably curved stave/brick constructions 128 of the present invention, the furnace can be bricked continuously around its circumference to eliminate conventional rammed gaps with bricks 118. As shown in FIG. 15, the gaps 142 between staves 130 are covered by one or more of bricks 118 of the present invention, eliminating the need for ramming filling material into such gaps 142. By eliminating the conventional rammed gaps 156 and 157 between the furnace bricks of adjacent main bodies 40 or staves 130, the integrity and life of the furnace and/or furnace lining is increased.

Another problem associated with the conventional stave/brick constructions 158 having pre-installed bricks 154, as shown in FIG. 14, is that because such conventional stave/brick constructions 158 are not continuously bricked around the circumference of furnace 149, edges 155 of numerous of the bricks 154 protrude into the interior of furnace 149 and are thus exposed to any matter falling through the furnace 149. Such protruding edges 155 tend to wear faster and/or are susceptible to being hit by falling matter, causing such bricks 154 with protruding edges 155 to break off into the furnace 149 and expose the staves 152 and 153. Again, the stave/brick constructions 128 of the present invention allow the furnace to be bricked continuously around its circumference thereby eliminating any such protruding brick edges 155, as shown in FIG. 15. Thus, the occurrences of (i) bricks 118 being pulled or knocked out of staves 130 and (ii) of staves 130 being directly exposed to the intense heat of the furnace are both significantly reduced by the stave/brick construction 128 of the present invention. Such characteristics make the stave/brick construction 128 of the present invention well-suited for use in the stack of blast furnaces.

While the preferred embodiment of a stave/refractory brick construction 128 of the present invention shown in FIGS. 8-13 and 15, includes a preferred embodiment of a furnace cooler or stave 130, the teachings of the present invention are also applicable to a frame/brick construction where such frame (not shown) is not limited to a furnace cooler or stave 130, but is a frame for providing a standing or other supported vertical or slanted wall of bricks, such as main bodies 40 whether or not refractory bricks, for applications including, but not limited to, furnace applications.

The stave/brick constructions of the present invention preferably also may be assembled initially by setting the bricks in a form and casting the stave around the bricks.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A plate cooler stave for use in a furnace having a shell wall, comprising:

a top portion housing a cooling fluid circulating tube including at least one cooling fluid inlet and at least one cooling fluid outlet for a flow of cooling fluid to and from the plate cooler stave from outside the furnace; and a main body, wherein the main body includes the top portion and wherein the main body is disposed at an angle relative to the top portion so that the main body is insertable into the furnace through an opening defined by the shell wall, wherein upon installation, at least a part of the top portion is disposed in the opening;

wherein the main body defines a plurality of ribs and a plurality of channels, wherein a front face of the main body defines a first opening into each of the channels; and wherein the plate cooler stave further comprises a plurality of bricks wherein at least one of the plurality of bricks is insertable into one of the plurality of channels via its first opening to a position, upon rotation of said at least one of the plurality of bricks, partially disposed in the one channel such that one or more portions of said at least one of the plurality of bricks at least partially engage one or more surfaces of the one channel and/or of a first rib of the plurality of ribs whereby said at least one of the plurality of bricks is locked against removal from the one channel through its first opening via linear movement without first being rotated.

2. The plate cooler stave of claim 1 wherein the main body is disposed along the shell wall.

3. The plate cooler stave of claim 1 wherein the main body is disposed substantially parallel to the shell wall.

4. The plate cooler stave of claim 1 wherein the main body is disposed between the shell wall and a refractory lining in the furnace.

5. The plate cooler stave of claim 1 further comprising a refractory lining disposed at least in part in or on the main body.

6. The plate cooler stave of claim 1 wherein the top portion is attached to a cover plate and the cover plate is secured to the shell wall.

7. The plate cooler stave of claim 6 wherein the cover plate is secured to an outside of the shell wall.

8. The plate cooler stave of claim 1 wherein the main body has one or more curved profiles.

9. The plate cooler stave of claim 1 wherein the main body has at least one curved profile substantially complementary with a curvature of the shell wall.

10. The plate cooler stave of claim 1 wherein the main body defines grooves or channels for holding refractory bricks.

11. The plate cooler stave of claim 1 wherein the angle between the top portion and the main body is greater than 90 degrees.

12. The plate cooler stave of claim 1 wherein the angle between the top portion and the main body is substantially 90 degrees.

13. The plate cooler stave of claim 1 wherein, upon installation of the plate cooler stave, the main body is disposed up, down or sideways with respect to the top portion.

14. The plate cooler stave of claim 1 wherein the plate cooler stave comprises a construction selected from the group consisting of cast copper with cast in pipe, cast copper with cored water passages, cast iron with cast in pipe, cast iron with water passages, drilled copper and extruded copper.

15. The plate cooler stave of claim 1 further comprising a thermocouple, wherein the thermocouple extends through the top portion and into the main body.

16. The plate cooler stave of claim 1 further comprising one or more surfaces defined by the top portion and/or the main body for supporting one or more adjacent plate cooler staves.

17. The plate cooler stave of claim 1 further comprising a spacer support.

18. The plate cooler stave of claim 17 wherein the spacer support contacts the shell wall upon installation of the plate cooler stave in the furnace.

19. The plate cooler stave of claim 1 wherein the main body and the shell wall are separated by a spacer support attached to the shell wall.

20. The plate cooler stave of claim 1 further comprising a steel band disposed around at least a part of the top portion, and a cover plate attached to the steel band.

21. The plate cooler stave of claim 1 wherein the main body defines one or more side openings into each of the channels.

22. The plate cooler stave of claim 1 wherein the rotation of the brick comprises a bottom of the brick moving in a direction towards the main body.

23. The plate cooler stave of claim 1 wherein a first rib surface of the first rib is complementary to a groove defined by a top of the brick and wherein the first rib surface is at least partially disposed in the groove.

24. The plate cooler stave of claim 1 wherein the main body is substantially flat.

25. The plate cooler stave of claim 1 wherein the main body is curved with respect to one or both of a horizontal axis and a vertical axis.

26. The plate cooler stave of claim 1 wherein the main body houses a plurality of pipes.

27. The plate cooler stave of claim 1 wherein the plurality of bricks at least partially disposed in the plurality of channels form a plurality of stacked, substantially horizontal rows of bricks protruding from the front face of the main body.

28. The plate cooler stave of claim 27 wherein one of the bricks cannot be pulled and/or rotated out of the first opening of its respective channel when another brick is disposed in a row above and partially or completely covers the one brick.

29. The plate cooler stave of claim 1 wherein the plurality of bricks comprise exposed faces that define a flat or uneven surface.

* * * * *